United States Patent
Foged et al.

(10) Patent No.: US 10,506,055 B2
(45) Date of Patent: Dec. 10, 2019

(54) AUTOMATIC RECIPIENT TARGETING FOR NOTIFICATIONS

(71) Applicant: Facebook, Inc., Menlo Park, CA (US)

(72) Inventors: Leif Erik Foged, Seattle, WA (US); Shaun Patric Allison, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 177 days.

(21) Appl. No.: 15/205,322

(22) Filed: Jul. 8, 2016

(65) Prior Publication Data
US 2018/0013844 A1 Jan. 11, 2018

(51) Int. Cl.
*H04L 29/08* (2006.01)
*H04L 12/58* (2006.01)
*G06N 20/00* (2019.01)
*G06N 5/00* (2006.01)
*G06N 5/02* (2006.01)

(52) U.S. Cl.
CPC .............. *H04L 67/22* (2013.01); *H04L 51/24* (2013.01); *H04L 51/32* (2013.01); *G06N 5/003* (2013.01); *G06N 5/025* (2013.01); *G06N 20/00* (2019.01); *H04L 67/02* (2013.01)

(58) Field of Classification Search
CPC ......... H04L 67/22; H04L 67/02; H04L 67/42; H04L 51/24; G06N 7/005; G06N 99/005
See application file for complete search history.

(56) References Cited

U.S. PATENT DOCUMENTS

| | | | |
|---|---|---|---|
| 2011/0125844 A1* | 5/2011 | Collier ................... | H04L 67/12 709/204 |
| 2012/0239507 A1* | 9/2012 | Braginsky .............. | G06Q 10/10 705/14.69 |
| 2013/0229915 A1* | 9/2013 | Parker ................... | H04W 28/26 370/230 |
| 2014/0172996 A1* | 6/2014 | Deeter ................... | H04L 51/24 709/206 |
| 2014/0173399 A1* | 6/2014 | Sorg ....................... | G06Q 50/01 715/206 |

(Continued)

FOREIGN PATENT DOCUMENTS

WO WO 2016090421 A1 * 6/2016 ....... H04N 21/44218

*Primary Examiner* — Brian J. Gillis
*Assistant Examiner* — Chhian (Amy) Ling
(74) *Attorney, Agent, or Firm* — Baker Botts L.L.P.

(57) ABSTRACT

In one embodiment, a method includes one or more computing devices detecting a triggering action by a user of a social-networking system, wherein the detecting includes receiving information about the triggering action from a client device associated with the user and accessing a queue including multiple notifications. The method also includes, for each of one or more of the notifications, calculating using a machine-learning model, a click-through probability that the user will interact with the notification upon display of the notification, wherein the machine-learning model is based at least in part on one or more features associated with the user or the notification, determining whether the click-through probability satisfies a threshold, and if the click-through probability satisfies the threshold, then sending the notification to the client device associated with the user for display, else, removing the notification from the queue.

17 Claims, 5 Drawing Sheets

(56) References Cited

U.S. PATENT DOCUMENTS

| | | | |
|---|---|---|---|
| 2014/0229407 A1* | 8/2014 | White | G06N 99/005 |
| | | | 706/12 |
| 2015/0006294 A1* | 1/2015 | Irmak | G06Q 50/01 |
| | | | 705/14.66 |
| 2017/0078859 A1* | 3/2017 | Kendrick | H04W 4/16 |
| 2017/0150331 A1* | 5/2017 | Van Snellenberg | H04W 4/12 |
| 2018/0114253 A1* | 4/2018 | Kakarlapudi | G06Q 30/0276 |
| 2018/0270520 A1* | 9/2018 | Ott | H04N 21/44218 |

* cited by examiner

AUTOMATIC RECIPIENT TARGETING FOR NOTIFICATIONS

TECHNICAL FIELD

This disclosure generally relates to delivering notifications to users.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, the social-networking system may implement a notification service to assist applications associated with the social-networking system in automatically targeting recipients for their notifications. The notification service may dynamically determine whether to deliver a notification to a user of an application in real time based on information associated with the user, the application, or the notification. Implementing machine-learning techniques, the notification service may ascertain that a notification is only delivered to those users who are likely to be interested in the notification. This service may improve an average click-to-impression ratio for notifications sent by an application and help the application meet performance requirements maintained by the social-networking system. Also, by preventing uninterested users from seeing the application's notifications, the notification service may allow the application to send out notifications at a higher frequency without the concern that the notifications would bother their recipients.

In particular embodiments, an application may authorize the social-networking system to automatically target the application's notification recipients by deciding whether to deliver one or more notifications to one or more users. The social-networking system may receive, from the application, a notification as well as identification information for one or more intended recipients ("candidate recipients") for the notification. For each candidate recipient, the social-networking system may calculate, at a time when one or more notifications are to be rendered to the candidate recipient ("render time"), a click-through probability that the candidate recipient will interact with the notification upon display of the notification. The calculation of the click-through probability may comprise feeding a feature vector extracted from a feature data set associated with the candidate recipient and the application into a machine-learning model. The machine-learning model may be structured so as to return a click-through probability based on the inputted feature vector. The social-networking system may then compare the calculated click-through probability with a threshold value. If the calculated click-through probability satisfies the threshold, the social-networking system may send information about the notification to the user's client system 130 for display. If the calculated click-through probability does not satisfy the threshold, the social-networking system may prevent the notification from being displayed to the user. It may remove the notification or delay its delivery.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
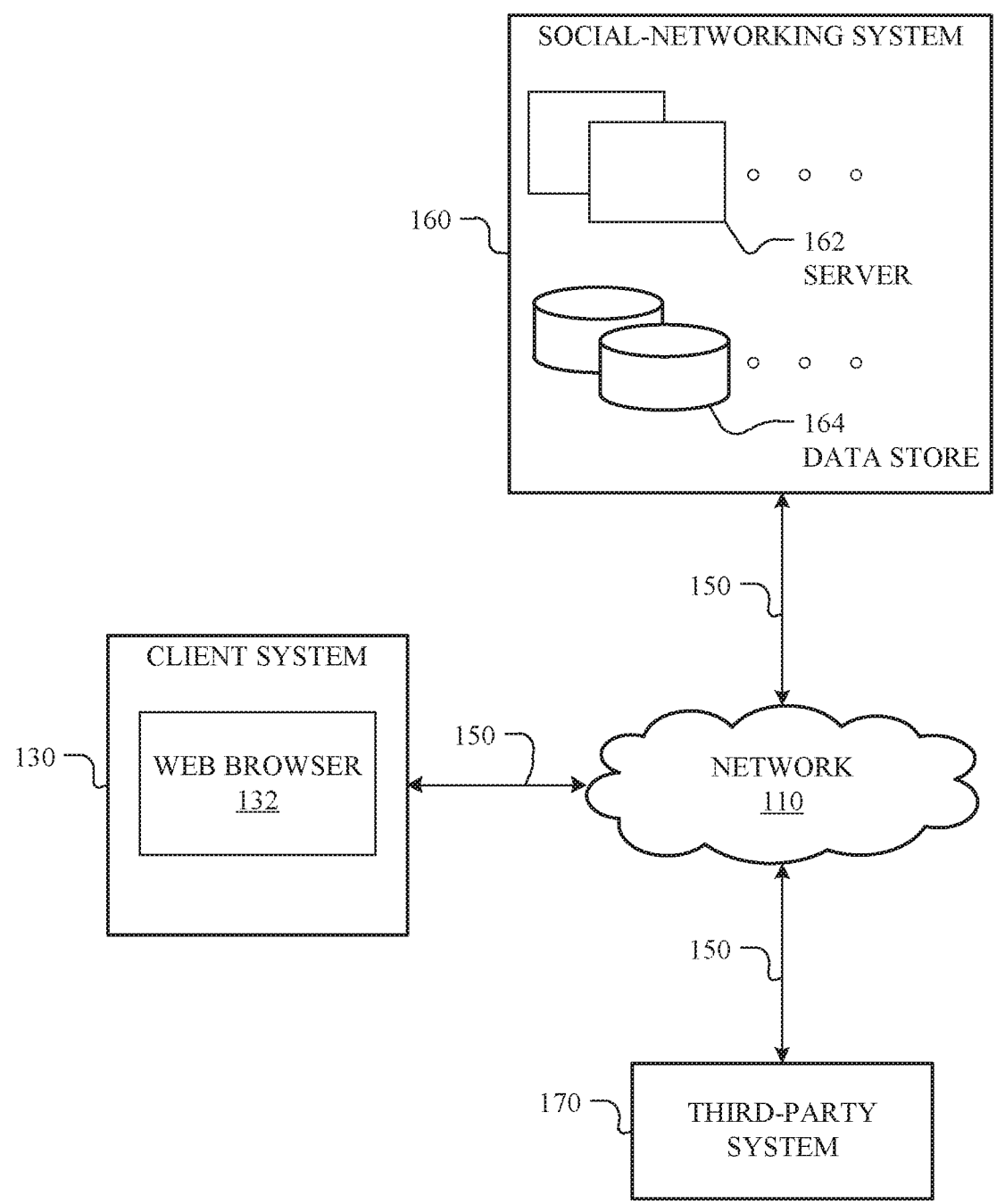
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via a network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
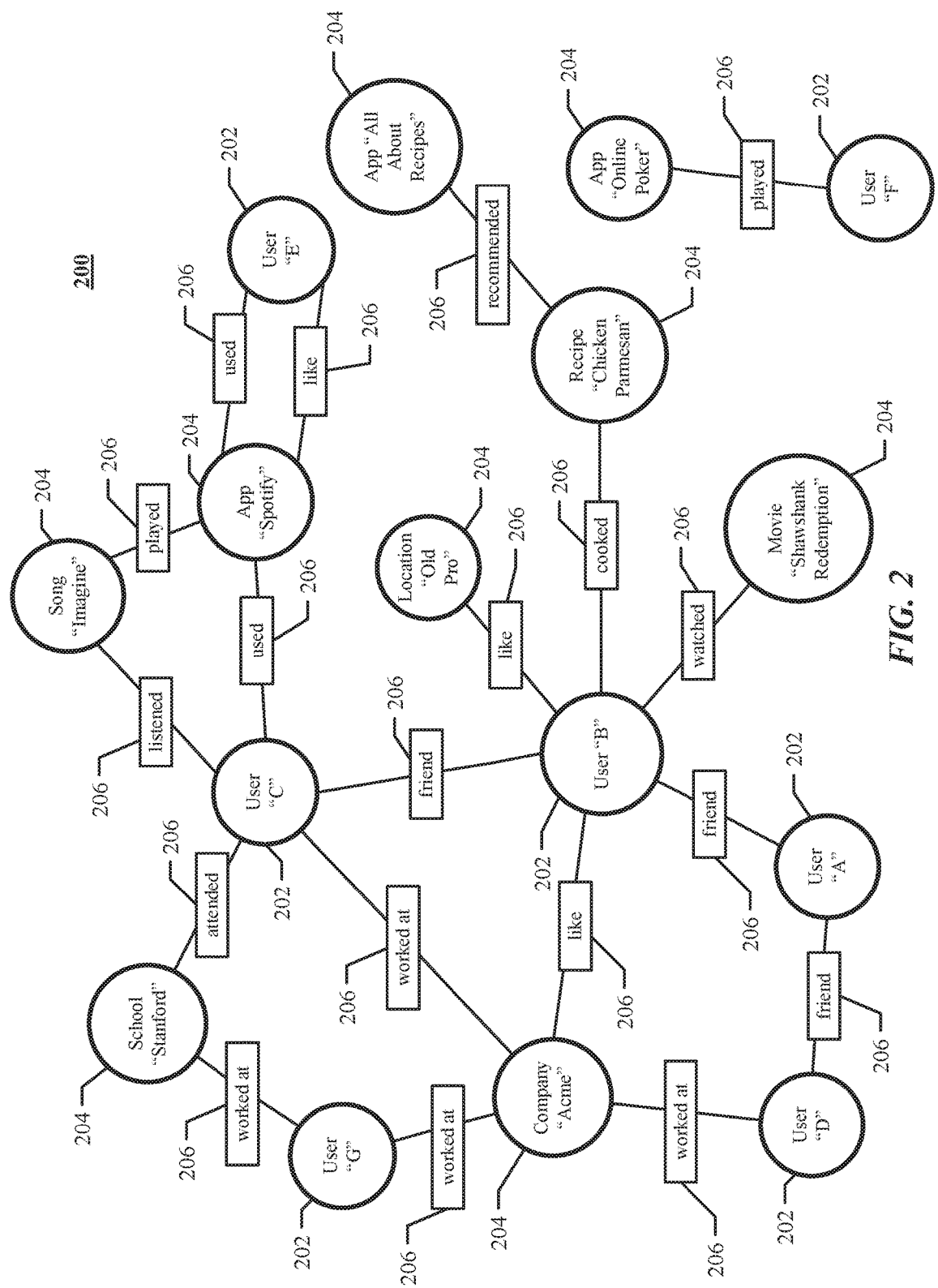
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, the social-networking system 160 may implement a notification service to assist applications associated with the social-networking system 160 in automatically targeting recipients for their notifications. The notification service may dynamically determine whether to deliver a notification to a user of an application in real time based on information associated with the user, the application, or the notification. The notification service may apply one or more machine learning techniques in performing its functionalities.

In particular embodiments, the social-networking system 160 may comprise a platform making a plurality of applications available to its users. The applications may be developed by the provider of the social-networking system 160 or one or more third-party developers. The applications may be implemented on one or more servers 162 of the social-networking system 160 or one or more servers associated with third-party systems 170. The applications may belong to one or more categories such as, for example, games, news, utilities, shopping, touring, or another suitable category. With proper authorizations from one or more users of the social-networking system 160, an application associated with the social-networking system 160 may send one or more notifications (e.g., "app-to-user notifications") to the users. The notifications may be sent via one or more delivery channels provided by the social-networking system 160 or one or more third-party systems 170 (e.g., a notifications panel, an application center, emails, SMS messages). A notification may achieve one or more communication purposes of its corresponding application. The purposes may comprise notifying a user about one or more events associated with the application, delivering one or more invitations from one or more social connections of the user, requesting the user to take one or more actions with respect to the application, another suitable purpose, or any combination thereof.

In particular embodiments, the social-networking system 160 may measure an effectiveness of one or more notifications sent from an application to its users. One example way of measuring the effectiveness may be by calculating a click-to-impression ratio ("CTI") for each notification sent and analyzing the CTI values. The CTI may correspond to a ratio of a number of times that the recipients of a notification interact with the notification to a number of times that the recipients view the notification. A high CTI may be interpreted to mean that its corresponding notification is interesting and engaging to the recipients. A low CTI may be interpreted to mean that its corresponding notification is boring or irrelevant to the recipients. Notifications with low CTI values may tend to be ignored, disabled, or considered spamming by their recipients. The delivery of such notifications may hurt the performance of their corresponding applications or the overall user experience provided by the social-networking system 160. In particular embodiments, the social-networking system 160 may control one or more privileges of the applications associated with social-networking system 160 in sending notifications to their users. The social-networking system 160 may, for example and without limitation, maintain a threshold CTI requirement for the applications. Failure of an application to meet the threshold CTI requirement by having a satisfying CTI during a particular time period may result in one or more penalties to the application (e.g., suspension of the application's privilege in sending notifications for a certain amount of time).

In particular embodiments, an application associated with the social-networking system 160 may give proper authorization and take advantage of the notification service provided by the social-networking system 160 in deciding whether to deliver a notification to a particular user. Implementing machine-learning techniques, the notification service may ascertain that a notification is only delivered to those users who are likely to be interested in the notification. This service may improve the application's average CTI and help the application meet the threshold CTI requirement of the social-networking system 160. Also, by preventing uninterested users from seeing the application's notifications, the notification service may allow the application to send out notifications at a higher frequency without the concern that the notifications would bother their recipients. The application may still meet the CTI requirement despite the increased amount of notifications.

In particular embodiments, an application may authorize the social-networking system 160 to automatically target the application's notification recipients by deciding whether to deliver one or more notifications to one or more users. The social-networking system 160 may receive, from the application, a notification as well as identification information for one or more intended recipients ("candidate recipients") for the notification. For each candidate recipient, the social-networking system 160 may calculate, at a time when one or more notifications are to be rendered to the candidate recipient ("render time"), a click-through probability that the candidate recipient will interact with the notification upon display of the notification. The calculation of the click-through probability may comprise feeding a feature vector extracted from a feature data set associated with the candidate recipient and the application into a machine-learning model. The machine-learning model may be structured so as to return a click-through probability based on the inputted feature vector. The social-networking system 160 may then compare the calculated click-through probability with a threshold value. If the calculated click-through probability satisfies the threshold, the social-networking system 160 may send information about the notification to the user's client system 130 for display. If the calculated click-through probability does not satisfy the threshold, the social-networking system 160 may prevent the notification from being displayed to the user. It may remove the notification or delay its delivery.

As an example and not by way of limitation, a third-party game may be made available to be played on the social-networking system 160. The developer of the game may authorize the social-networking system 160 to control the delivery of the game's notifications using the notification service according to particular embodiments. The third-party game may generate one or more notifications to be sent to one or more of its users. The notifications may, for example, remind a user to log back in and play the game, notify the user about a game-related event (e.g., time-based awards becoming collectible), notify the user about activities of the user's connections in the game (e.g., a friend's battle request), or provide the user updates to the game. For each notification, the third-party game may specify one or more candidate recipients. It may send the notification and identification information for the candidate recipients to the social-networking system 160. Rather than immediately delivering the notification to all specified candidate recipients, the social-networking system 160 may store the received information on one or more of its data stores 164. For a particular candidate recipient of the third-party game's notification, the social-networking system 160 may detect a triggering action by the candidate recipient, which may be, for example, a click-through or mouseover of a notifications icon (e.g., the Notifications jewel on Facebook.com). Such a triggering action may signal to the social-networking system 160 that notifications are to be displayed to the user. The social-networking system 160 may thereby determine, in real time, whether to deliver each notification stored for the user by calculating a click-through probability for the user with respect to the notification and comparing the calculated click-through probability with a threshold value.

Besides game applications, the notification service according to particular embodiments may similarly be applied to other types of applications. As an example and not by way of limitation, a fantasy sports application associated with the social-networking system 160 may send notifications (e.g., player performance updates, user rank updates) to its users through the notification service according to particular embodiments. The notification service may allow the application to send notifications only to users who tend to be interested in such notifications. As another example and not by way of limitation, a smart home management application associated with the social-networking system 160 may send notifications (e.g., alarm that oven is left on, notice that a solar battery is fully charged) to its users through the notification service according to particular embodiments. The social-networking system 160 may apply different machine-learning models in calculating click-through probabilities for the notifications of different types of applications in order to address their different user's experience concerns. The characteristics or features of a particular application may be used to customize the machine-learning model. Although this disclosure describes automatically targeting recipients for a notification sent by an application associated with the social-networking system 160 in a particular manner, this disclosure contemplates automatically targeting recipients for a notification sent by an application associated with the social-networking system 160 in any suitable manner.

Figure 3:
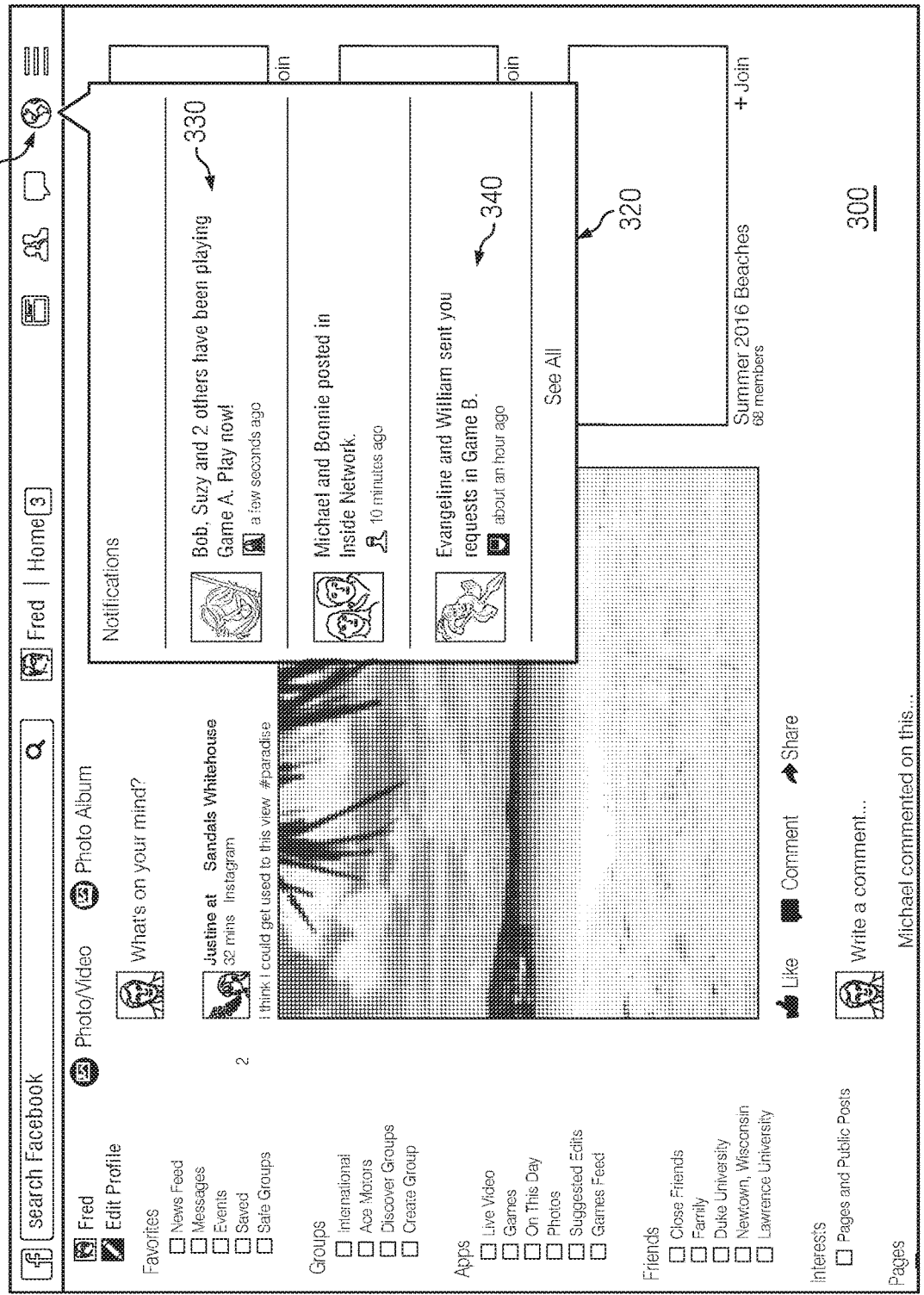
FIG. 3 illustrates an example user interface 300 displaying notifications associated with applications.

FIG. 3 illustrates an example user interface 300 displaying notifications associated with applications. In particular embodiments, the social-networking system 160 may provide a user interface 300 for display on a client system 130 associated with a user. The user interface 300 may comprise a notifications icon 310. As an example and not by way of limitation, the notifications icon 310 may take the form of a Notifications jewel as shown in FIG. 3. The social-networking system 160 may detect one or more interactions that a user may have with the notifications icon 310. The user may interact with the notifications icon 310 by moving a cursor on or near the notifications icon 310 (e.g., a mouseover). The user may further interact with the notifications icon 310 by clicking on it. This interaction may cause one or more notifications to be displayed to the user. Once the user clicks on the notifications icon 310, the client system 130 of the user may send a request for notifications to the social-networking system 160. The user interface 300 may display, in response to the user's clicking on the notifications icon 310, a notifications panel 320 to the user. The notifications panel 320 may display one or more notifications. The notifications 330 and 340 may be associated with one or more applications authorized by the user. The notifications panel 320 may further display one or more notifications corresponding to other functionalities of the social-networking system 160. Each notification may comprise one or more images or one or more messages. The notifications may achieve one or more communication purposes. For example, the notification 330 may notify the user about two friends' involvement in a game and invite the user to play the game. As another example, the notification 340 may communicate application-related requests sent by the user's social connections. The displayed notifications may be organized on the notifications panel 320 in chronological order or another suitable order. Although FIG. 3 illustrates displaying particular notifications associated with particular applications in a particular manner, this disclosure contemplates displaying any suitable notifications associated with any suitable applications in any suitable manner.

Figure 4:
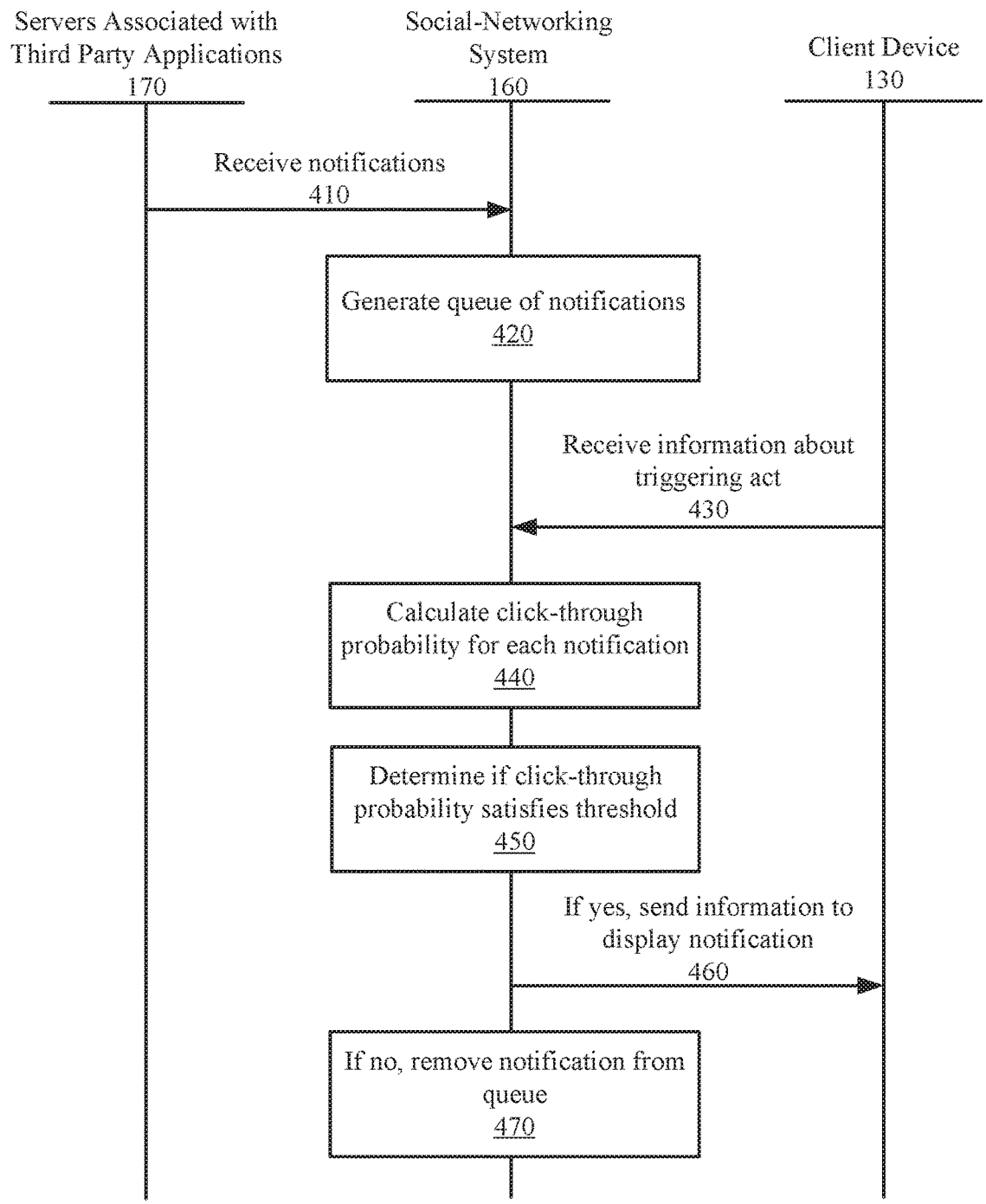
FIG. 4 illustrates an example method for automatically targeting recipients for a notification sent by an application associated with the social-networking system.

FIG. 4 illustrates an example method for automatically targeting recipients for a notification sent by an application associated with the social-networking system 160. The application may be implemented on one or more servers associated with a third-party system 170. The social-networking system 160 may send the notification to one or more client systems 130 associated with one or more users of the social-networking system 160. In particular embodiments, the application may authorize the social-networking system 160 to decide, for each of one or more candidate recipients of the notification, whether to display the notification to the candidate recipient.

At step 410, the social-networking system 160 may receive a notification from an application associated with the social-networking system 160. The application may be developed by a third-party developer and implemented on one or more servers associated with a third-party system 170. In particular embodiments, the application may alternatively be developed by a provider of the social-networking system 160 and implemented as a component of the social-networking system 160. The application may be made available to a plurality of users through a digital distribution platform provided by the social-networking system 160. A user of the social-networking system 160 may browse a user interface associated with the digital distribution platform, obtain information about one or more applications listed in the user interface, and select one or more applications that are of interest. The user may alternatively or additionally search for one or more of the applications using a search engine associated with the social-networking system 160. The user may authorize an application on the online social network. This may cause the application to be added to a profile or account associated with the user or to be "installed" on the online social network in association with the user. The user's authorization may also cause a program associated with the application to be downloaded and installed on the user's client system 130.

In particular embodiments, an application authorized by a user may be allowed to send a notification to the user via the social-networking system 160. The notification may achieve one or more communication purposes of the application. The purposes may comprise notifying a user about one or more events associated with the application, delivering one or more invitations from one or more social connections of the user, requesting the user to take one or more actions with respect to the application, another suitable purpose, or any combination thereof. Sending notifications may be an effective way of reengaging users of the application. The notification may comprise a free-form message. The message may comprise, for example, plain text, names of one or more users, references to one or more users (e.g., ID numbers used by the social-networking system 160 to identify users), an image associated with the corresponding application, another suitable element, or any combination thereof. The notification may be customized for a particular user by referencing the user or one or more connections of the user, mentioning the name of the user, or containing content associated with the user. The notification or one or more elements of the notification may each be associated with a URL linking a webpage associated with the corresponding application. The social-networking system 160 may set a character or word limit for the length of the message included in the notification. It may provide one or more templates for formatting the message. As an example and not by way of limitation, a notification associated with a game application may comprise the message "James and John invite you to join the battle. Play now!" This message is customized for its recipient by referencing two social connections of the recipient. It may communicate one or more invitations of the referenced social connections. As another example and not by way of limitation, a notification associated with a fantasy sports application may comprise the message "Fumble return touchdown by Malik," which may be sent to a plurality of users as a general notice about an event associated with the application. As yet another example and not by way of limitation, a notification from a smart home management application may comprise the message "Your oven is left on." This message may be specifically customized for its recipient based on data collected from the recipient's home. It may serve as a request for particular action of the recipient (e.g., going back home and turning off the oven).

In particular embodiments, a user may be notified about the existence of a pending notification through one or more elements (e.g., a notifications icon 310) of a user interface 300 associated with the social-networking system 160. The user may read the pending notification by interacting with (e.g., clicking on) the one or more elements. The social-networking system 160 may have a pending notification displayed to the user in one or more fields (e.g., a notifications panel, a dropdown menu, a pop-up window) associated with the user interface. The application associated with the notification may have created content to be included in the notification at a third-party system 170 associated with the application. The content, as well as other information associated with the notification, may be sent to the social-networking system 160 via a network 110. The application may cause the notification comprising the content to be generated by issuing a request to an API associated with the social-networking system 160. In association with the API request, the application may additionally specify one or more candidate recipients for the notification. The application may have accessed information associated with one or more of its users to identify those who might find the notification relevant or useful as candidate recipients.

At step 420, after receiving the notification and its related information from an application, the social-networking system 160 may store the received information on one or more data stores 164. The stored information for a plurality of notifications may be organized based on the candidate recipients of the notifications. For each user who is a candidate recipient for at least one of the notifications, all pending notifications for the user may be stored in association with the user. They may be stored as a sequential collection or in a queue structure. The queue of notifications pending for a particular user may be ordered based on a time associated with the arrival of each notification at the social-networking system 160. It may otherwise be ordered based on another suitable criterion. The social-networking system 160 may be functional to add, modify, or remove the notifications in the queue.

At step 430, the social-networking system 160 may detect a triggering action by a candidate recipient of the notification. The detecting may comprise receiving information about the triggering action from a client system 130 associated with the candidate recipient. In particular embodiments, the detected triggering action may signal to the social-networking system 160 that the candidate recipient is requesting or is about to request to view notifications associated with the social-networking system 160. This moment may be named "render time," which describes the time when one or more notifications are rendered in a user interface for the candidate recipient. At render time, the social-networking system 160 may determine whether to display each of one or more pending notifications to the candidate recipient. The social-networking system 160 may recognize one or more acts of a user as triggering actions. The recognized triggering actions may comprise a click-through of an icon by the user, a mouseover of an icon by the user, a request to log into the social-networking system 160 by the user, another suitable act, or any combination thereof. The triggering action may be conducted by the candidate recipient in a user interface associated with the social-networking system 160. The user interface may be in the format of a webpage and displayed by a web browser 132 on a client system 130 of the candidate recipient. The user interface may alternatively be displayed by a mobile application corresponding to the social-networking system 160 that is installed on the candidate recipient's client system 130. The client system 130 may detect the candidate recipient's interactions with the user interface using one or more I/O devices such as, for example, a mouse or a touchscreen. Upon detecting particular triggering actions by the candidate recipient (e.g., clicking, mouseover, typing of password for login), the client system 130, via a web browser 130 or a mobile application, may send a request to the social-networking system 160 for stored notifications pending for the candidate recipient. The notification request may contain information about the act taken by the candidate recipient that triggers the request. The social-networking system 160 may then detect, based on the received notification request, that a triggering action has occurred and that it is render time.

As an example and not by way of limitation, the candidate recipient may open a mobile application corresponding to the social-networking system 160 (e.g., the Facebook app) that is installed on the candidate recipient's client system 130. The mobile application may be configured to automatically log the candidate recipient in the social-networking system 160 upon launching. This log-in event may trigger a notification request to be sent to the social-networking system 160. The social-networking system 160 may detect, based on the received information, that the candidate recipient has opened the mobile application and recognize it as a triggering action. As another example and not by way of limitation, the candidate recipient's act of opening the mobile application may not be sufficient to be recognized as a triggering action. After being opened, the mobile application corresponding to the social-networking system 160 may display a user interface to the candidate recipient. The user interface may comprise a notifications icon 310. The candidate recipient may move a cursor on top of the notifications icon 310 using an I/O device such as a mouse. At this moment, the mobile application may be configured to send a notification request to the social-networking system 160. The social-networking system 160 may receive information about this mouseover act and recognize it as a triggering action. As yet another example and not by way of limitation, the candidate recipient's mouseover of the notifications icon 310 may be insufficient to be recognized a triggering action. The social-networking system 160 may be configured to recognize a clicking on the notifications icon 310 as a triggering action.

In particular embodiments, upon detecting a triggering action by the candidate recipient, the social-networking system 160 may access the queue comprising a plurality of pending notifications for the candidate recipient. The queue may comprise one or more notifications sent to the social-networking system 160 by one or more applications since the last time the candidate recipient viewed notifications. The queue may also comprise one or more notifications which have been sent to the social-networking system 160 before user's previous time viewing the notifications and whose delivery was delayed by the notification service. The social-networking system 160 may access the queue comprising pending notifications immediately after detecting the candidate recipient's triggering action.

At step 440, the social-networking system 160 may calculate, using a machine-learning model, a click-through probability for at least one of the accessed notifications for the candidate recipient. The click-through probability for the notification may correspond to a probability that the candidate recipient will interact with the notification (e.g., a click-through or conversion event) upon display of the notification. The machine-learning model may be based at least in part on one or more features associated with the candidate recipient or the notification. The machine-learning model may be supervised or unsupervised. It may have been trained using a training data set. The training data set may comprise historical event information associated with one or more applications and one or more users associated with the social-networking system 160. The training data set may comprise records of a plurality of interactions between the users, the applications, and notifications sent by the applications. The machine-learning model may apply one or more machine-learning techniques such as, for example, decision tree learning, association rule learning, deep learning, inductive logic programming, reinforcement learning, another suitable machine learning technique, or any combination thereof. The machine-learning model may be configured to perform one or more functions such as, for example, classification, regression, clustering, another suitable function, or any combination thereof. The machine-learning model may comprise a loss function. The value of the loss function may be minimized when applying the machine-learning model to the training data set. The machine-learning model may be configured to process input feature vectors. A feature vector may be an n-dimensional vector of numerical features representing an object. The feature vector may exist in a feature space. Each dimension of the feature space may correspond to an artificially defined concept or a variable or characteristic derived by the machine-learning model based on the training data set. Each feature vector may be mapped via the machine-learning model to a resulting value. The relationship between the resulting value and the feature vector may be expressed by a linear function, wherein each term of the function corresponds to a term of the feature vector and comprises a coefficient. The relationship between the resulting value and the feature vector may alternatively be expressed by another type of function.

In particular embodiments, the machine-learning model may be configured to treat each user-notification pair as an object. The social-networking system 160 may extract one or more features from a feature data set associated with the candidate recipient with respect to the notification. The feature data set may be generated based on one or more logs of historical events associated with the candidate recipient. Here, the feature data set may comprise information about the engagement of one or more users of the social-networking system 160 with one or more applications associated with the social-networking system 160. Specifically, the feature data set may comprise information about a user's reactions to recommendations, notifications, or posted images associated with the applications. It may further comprise information about a user's direct interactions with the applications such as, for example, clicking on an icon associated with an application, installing an application, using an application, playing a game, another suitable way of interaction, or any combination thereof. Here, the users and applications, whose interactions are used to form the feature data set for the candidate recipient, may have been selected based on their relationships with the candidate recipient. As an example and not by way of limitation, a selected user may be a friend of the candidate recipient on the social-networking system 160. As another example and not by way of limitation, a selected application may have been authorized by the candidate recipient on the social-networking system 160. The social-networking system 160's collection of information for the feature data set may be subject to one or more privacy settings of the one or more users' involved. The features extracted from the feature data set may correspond to one or more concepts artificially defined by developers of the machine-learning model. They may alternatively correspond to one or more variables or characteristics derived by the machine-learning model based on the training data set. The social-networking system 160 may then generate, based on the extracted features, a feature vector for the candidate recipient with respect to the notification. In other words, the social-networking system 160 may create a feature vector to describe each user-notification pair or each object for the machine-learning model. The features extracted as components of the feature vector may be specifically directed to the notifications service or be generally applicable to one or more other functionalities or services provided by the social-networking system 160. Based on the feature vector, the social-networking system 160 may then calculate a click-through probability for the candidate recipient with respect to the notification using the machine-learning model.

In particular embodiments, the social-networking system 160 may extract, from the feature data set associated with candidate recipient, one or more features directed specifically to the notification service. The features may be particularly relevant in the context of notification delivery. The notification-specific features may comprise a user's frequency of interacting with notifications associated with the social-networking system 160 within a specified timeframe, the user's frequency of interacting with the application sending the notification within a specified timeframe, the user's click-through rate for notifications associated with the social-networking system, the user's click-through rate for notifications associated with the application, a time of the user's most recent interaction with the application, a category corresponding to the application, a period between the detecting of the triggering action and the receiving of the notification, another suitable feature, or any combination thereof.

In particular embodiments, the social-networking system 160 may access social-networking information associated with the candidate recipient to determine how often the candidate recipient has interacted with notifications associated with the social-networking system 160 within a specified timeframe. The timeframe may be, for example, the past ten minutes, the past one day, the past one week, or any other suitable timeframe. The scope of notifications considered in this determination may cover all notifications delivered by the social-networking system 160, notifications sent by a particular category of applications, or only previous notifications sent by the application associated with the current notification. A higher click-through probability may be calculated for a user who has interacted with the notifications more often. As an example and not by way of limitation, a user who has clicked on two notifications associated with the social-networking system 160 within the past one day may have a higher click-through probability for a particular notification than a user who has not clicked on any notifications within the same time period for the same notification.

In particular embodiments, the social-networking system 160 may access one or more event logs associated with the application sending the notification to determine how often the candidate recipient has interacted with the application within a specified timeframe. Frequent interactions between the candidate recipient and the application may indicate that the candidate recipient is interested in the application and is likely be interested in notifications sent by the application. As an example and not by way of limitation, the social-networking system 160 may determine that the user has played a game five times during the past one hour. It may calculate a high click-through probability for the user with respect to a notification sent by the game based on this feature of frequent interactions.

In particular embodiments, the social-networking system 160 may access one or more event logs associated with the candidate recipient to determine the candidate recipient's click-through rate for notifications associated with the social-networking system 160 within a specified timeframe. The social-networking system 160 may also specifically determine this click-through rate only for previous notifications sent by the application associated with the current notification. The candidate recipient may be determined to be more likely to interact with a new notification if the candidate recipient has a high click-through rate for previous notifications sent by the application or notifications in general. As an example and not by way of limitation, a fantasy sports application may send game update notifications to its users on a regular basis. The social-networking system 160 may calculate a higher click-through probability for a user who has clicked on those notifications 50% of the times in the past than a user who has clicked on those notifications 20% of the times.

In particular embodiments, the social-networking system 160 may access one or more event logs associated with the application sending the notification to determine the most recent time that the candidate recipient interacted with the application. In general, it may be the case that a user is more likely to interact with a notification sent by an application that is recently interacted with by the user than a notification sent by an application that is not. As an example and not by way of limitation, a user may have installed a game application one year ago and has not played the game for six months. For a notification sent by the game application, the social-networking system 160 may calculate a low click-through probability for the user considering this long inactive period. On the other hand, if the user has just played the game five minutes ago, the social-networking system 160 may calculate a high click-through probability based on the feature.

In particular embodiments, the social-networking system 160 may determine that the application sending the notification belongs to a particular category and extract this category as a feature. It may be the case that users of the social-networking system 160 are more likely to interact with notifications sent from certain categories of applications than other categories. As an example and not by way of limitation, a fantasy sports application may belong to the "entertainment" category; a smart home management application may belong to the "utilities" category. It may be the case that, based on historical information associated with users of the social-networking system 160, the users are generally more likely to interact with notifications sent by utility applications than notifications sent by entertainment applications. This may be because the former generally send fewer but more important notifications than the latter. The social-networking system 160 may thereby calculate a higher click-through probability for a notification sent by the smart home management application than for a notification sent by the fantasy sports application based on this feature.

In particular embodiments, the social-networking system 160 may record the time when it receives the notification. It may then calculate a length of time that the notification has stayed in the queue. The longer a notification stays in the queue, the more likely the notification has become invalid or irrelevant to its recipients. As an example and not by way of limitation, the social-networking system 160 may have stored two notifications from a game inviting the user to join a battle with one of the user's friends. One notification may have been sent to the social-networking system 160 one day ago; the other may have been sent to the social-networking system 160 five minutes ago. The social-networking system 160 may calculate a higher click-through probability for the latter than for the former because the invitation in the former is likely to no longer be valid. It may also be rendered irrelevant by the latter. In particular embodiments, the application sending the notification may specify a term for the notification. The term may correspond to a period during which the notification is valid. As an example and not by way of limitation, a notification sent by a game application to the social-networking system 160 may comprise a message requesting a user to claim an award in the game. The award may only be available for twenty-four hours in the game. The game application may thereby specify that the term for this notification is twenty-four hours. If the social-networking system 160 thereafter detects a triggering action by the user that is more than twenty-four hours after the notification is received from the game application, the social-networking system 160 may calculate a 0% click-through probability for the notification because it is no longer valid. In particular embodiments, the social-networking system 160 may further predict one or more moments that the user may conduct a triggering action, where each moment is within a term specified for a notification. The social-networking system 160 may separately calculate a click-through probability for each of the predicted moments and select a moment with the highest click-through probability to deliver the notification to the user.

In particular embodiments, the social-networking system 160 may further extract from the feature data set one or more user-level features as components of the feature vector associated with the candidate recipient. The user-level features may capture how the candidate recipient interacts with the social-networking system, a particular application, or a category of applications. These features may be extracted based on real-time as well as historical social-networking information associated with the candidate recipient. The user-level features may comprise the candidate recipient's frequency of interacting with applications associated with the social-networking system 160. The determination of this frequency may be made globally considering all data available about the candidate recipient. Alternatively, the data used may be limited to a particular timeframe or a particular category of applications. As an example and not by of limitation, the social-networking system 160 may determine a number of times that the candidate recipient has used any application associated with the social-networking system 160 within a specified period and extract the value as a feature associated with the candidate recipient. Additionally or alternatively, the social-networking system 160 may determine a frequency at which the candidate recipient has interacted with applications belonging to the same category as the application sending the notification and extract the frequency as a feature associated with the candidate recipient. The candidate recipient's frequency of interacting with one or more applications may be positively correlated with the candidate recipient's likelihood of being interested in one or more notifications. The user-level features may also comprise a time of the candidate recipient's most recent interaction with an application associated with the social-networking system 160. This value may be determined for any application associated with the social-networking system 160 or applications belonging to a particular category. As an example and not by way of limitation, the social-networking system 160 may determine the time when the candidate recipient last played any game associated with the social-networking system 160 and extract this time as a feature associated with the candidate recipient. If the candidate recipient has recently been active on the social-networking system 160 by interacting with one or more applications, it may be the case that the candidate recipient is probably interested in notifications. The user-level features may further comprise one or more other suitable features extracted from social-networking information associated with the candidate recipient.

In particular embodiments, the social-networking system 160 may further extract from the feature data set one or more application-level features as components of the feature vector associated with the notification. The application-level features may describe a particular application's performance as compared with other applications associated with the social-networking system 160. The application-level features for the application sending the notification may comprise, for example, a number of daily active users ("DAU") of the application, a number of monthly active users ("MAU") of the application, a growth rate of the application's DAU, a growth rate of the application's MAU, a conversion rate associated with the application among users of the social-networking system 160 fitting a particular demographic description, a language supported by the application, another suitable feature, or any combination thereof. The above features may be extracted from one or more event logs associated with the application. As an example and not by way of limitation, the application sending the notification may have a DAU of 10,000. A similar application may have a DAU of 1,000. Using features extracted based on the applications' corresponding DAU values, the social-networking system 160 may calculate a higher click-through probability for a notification sent by the former application than a notification sent by the latter application. It may be the case that an application with a higher DAU is more popular on the online social network; a notification sent by the application is more likely to be clicked on. As another example and not by way of limitation, the DAU for the application sending the notification may increase at a rate of 5% per month. In contrast, the DAU for another application may decrease at a rate of 5% per month. Using features extracted based on the applications' corresponding DAU growth rates, the social-networking system 160 may calculate a higher click-through probability for a notification sent by the former application than a notification sent by the latter application. As yet another example and not by way of limitation, the social networking system 160 may access demographical information associated with the candidate recipient with proper permissions. It may identify a group of users who belong to the same demographical group as the candidate recipient and calculate a conversion rate of the application among the identified group of users. The conversion rate may correspond to a probability that a user having seen information associated with the application ends up installing the application. A feature extracted based on the conversion rate may be positively correlated with the click-through probability associated with the notification. As yet another example and not by way of limitation, the social-networking system 160 may determine one or more languages supported by the application sending the notification and extract such information as a feature. The social-networking system 160 may further determine one or more languages spoken by the candidate recipient based on profile or other social-networking information associated with the candidate recipient. Overlap between the languages supported and the languages spoken may positively affect the calculated click-through probability.

In particular embodiments, the social-networking system 160 may compute one or more similarity scores between the application associated with the notification and one or more other applications, identify one or more similar applications based on the computed similarity scores, and extract one or more features based on the user's interactions with the identified similar applications. In addition to notification-specific features, user-level features, and application-level features, the social-networking system 160 may further extract one or more features for the user-notification pair based on one or more similar applications to the application sending the notification. It may be the case that the behavior of a user toward one application is indicative of the user's potential behavior toward a similar application. The social-networking system 160 may compare the application sending the notification with one or more other applications and calculate one or more similarity scores between the applications. The similarity scores may be calculated based on one or more application-related characteristics such as, for example, category, functionality, genre, developer, another suitable characteristic, or any combination thereof. The social-networking system 160 may then identify one or more similar applications based on the similarity scores and extract one or more features based on engagements of one or more users with the identified similar applications. The one or more users may comprise the candidate recipient or users related to the candidate recipient. As an example and not by way of limitation, the application sending the notification may be a game application. The social-networking system 160 may have compared the game application with a plurality of other games; it may have identified or identify in real time one or more other games that are similar to the game application. The identified similar games may belong to the same category as the game application, have similar graphic features to those of the game application, or be developed by the same developer. The social-networking system 160 may then access one or more event logs to obtain a history of the candidate recipient's previous interactions with the identified similar games and extract one or more features from such a history. For example, the features may comprise a click-through rate of the candidate recipient with respect to notifications sent by the identified similar games. This feature may be used in the current calculation of the click-through probability.

In particular embodiments, the social-networking system 160 may further extract one or more features based on one or more determined "per-user preferences" associated with the candidate recipient. The social-networking system 160 may access historical social-networking information associated with the candidate recipient with proper permissions. The accessed social-networking information may comprise, for example, a game-play history of the user within a specified timeframe, an application-usage history of the user within a specified timeframe, or other suitable social-networking information. The social-networking system 160 may then feed the accessed information into a matrix factorization algorithm, which may return a list of applications that the candidate recipient is likely to be interested in as results. Each listed application may be associated with a corresponding preference value. A preference value may correspond to an estimated level of interest that the candidate recipient has in the corresponding application. One or more features may be extracted from the list of applications as well as the applications' preference values. Such features may be used by a ranking algorithm to optimize the machine-learning model or the notification service. As an example and not by way of limitation, the social-networking system 160 may access the candidate recipient's social-networking information and determine that the candidate recipient is likely to be interested in a particular game. This game may be assigned a high preference value accordingly. Later on, the game may be authorized by the candidate recipient on the social-networking system 160 and generate a notification addressed to the candidate recipient. The social-networking system 160 may include the preference value associated with the game in a feature vector. Based on the feature vector, the social-networking system 160 may calculate a high click-through probability for the candidate recipient with respect to the notification.

In particular embodiments, the social-networking system 160 may calculate, using the machine-learning model, the predicted probability for a click-through or conversion event associated with the candidate recipient based on the feature vector. The machine-learning model may be configured to accept feature vectors comprising the types of features extracted by the social-networking system 160 as input. It may be configured to map such an input feature vector to a value corresponding to a click-through probability or a probability of another conversion event. The machine-learning model may assign a weight to each feature of the input feature vector. The weight assigned to each feature may be based on a purpose of the machine-learning model. For example, a machine-learning model for the notification service may weigh notification-specific features more than other features. The conversion events may comprise, for example, clicking on the notification, clicking on an image associated with the notification, opening the application associated with the notification, playing a new game, interacting with a friend as requested by the notification, another suitable conversion event, or any combination thereof. The calculated click-through probability may be stored on one or more data stores 164 associated with the social networking system 160 for a specified period of time (e.g., two hours). The length of the period may be based on a timeframe within which the calculated click-through probability is assumed to be valid. Within the specified period of time, the calculated click-through probability may be reused for the same notification or one or more other notifications.

At step 450, the social-networking system 160 may determine whether the calculated click-through probability satisfies a threshold. The click-through probability threshold may be determined based on a required CTI that the social-networking system 160 maintains for applications. As an example and not by way of limitation, the social networking system 160 may require an application to have a minimum 17% CTI. It may suspend the application's privilege of sending notifications if the application's average CTI falls below 17%. Based on historical data or statistical analysis, the social-networking system 160 may determine that this 17% CTI requirement is likely to be met if a notification is delivered to a candidate recipient only if the calculated click-through probability is equal to or larger than 8%. The social-networking system 160 may thereby set the threshold click-through probability at 8%. It may compare the calculated click-through probability with the threshold and determine if the calculated value satisfies the threshold. In particular embodiments, determining whether the click-through probability satisfies a threshold may further comprise determining whether the detected triggering action takes place within a timeframe within which the notification is valid. The notification may be associated with a term, within which the notification is valid. The term may be specified by the application sending the notification, sent to the social-networking system 160 along with the notification, and stored in relation to the notification. The social-networking system 160 may compare a moment associated with the triggering action with an expiration time of the term. If the triggering action occurs outside the term, the social-networking system 160 may determine that the notification should not be delivered to the candidate recipient.

In particular embodiments, the social-networking system 160 may determine whether to display the notification to the candidate recipient based on whether the calculated click-through probability satisfies the threshold. If the click-through probability satisfies the threshold, the social-networking system 160 may execute step 460 by sending information to display the notification to the candidate recipient. The social-networking system 160 may send the notification to the client system 130 of the candidate recipient for display at render time. If the click-through probability does not satisfy the threshold, the social-networking system 160 may prevent the notification from being displayed to the candidate recipient. At step 470, the social-networking system 160 may remove the notification from the queue. Alternatively, the social-networking system 160 may hold the notification in the queue and delay its delivery. It may re-calculate a click-through probability for the candidate recipient with respect to the notification the next time it detects a triggering action from the candidate recipient and re-determine whether to display the notification to the candidate recipient. Before delivering the notification, the social-networking system 160 may further validate necessary authorization required for the delivery. It may check at render time, for example, whether the application has been uninstalled or removed from the social-networking system 160 by the candidate recipient.

In particular embodiments, the social-networking system 160 may store more pending notifications in the queue than can be displayed to the candidate recipient in one instance. The social-networking system 160 may access the notifications in the queue in a particular order (e.g., a chronological order based on the times when the notifications arrive at the social-networking system 160) and determine whether to display each accessed notification to the candidate recipient. The social-networking system 160 may terminate this process as soon as the number of satisfying notifications it has identified equals the maximum number of notifications that can be displayed to the candidate recipient. It may immediately send the identified satisfying notifications to the candidate recipient's client system 130 for display. Alternatively, the social-networking system 160 may continue this process to identify more satisfying notifications than can be displayed to the candidate recipient, rank the identified notifications, and send one or more top-ranked notifications to the candidate recipient's client system 130 for display. In this process, a notification may be moved forward in the queue based on its characteristics, such as its click-through probability with respect to the candidate recipient. Additionally, a notification with a below-threshold click-through probability may be removed from the queue or moved backwards in the queue.

In particular embodiments, the notification may be displayed to the candidate recipient via one or more different delivery channels. The possible delivery channels may comprise, for example, the notifications panel, a notifications center webpage, a newsfeed interface, an application center, pop-up windows, banner display, emails, SMS messages, another suitable delivery channel, or any combination thereof. The delivery channel via which to deliver a notification may be specified by the application sending the notification. Alternatively, the notification service of the social-networking system 160 may comprise the functionality of determine an optimal delivery channel for sending a particular notification. The parameters of the machine-learning model may be varied for different delivery channels in terms of the features considered and the weights assigned to different features. As an example and not by way of limitation, the machine-learning model may be more optimistic in returning a click-through probability when the delivery channel is an application center associated with the social-networking system 160 than if the delivery channel is a notifications panel. It may be the case that a user is more likely to be interested in application-related notifications when the user deliberately choose to visit the application center. More information on selecting delivery channels may be found in U.S. patent application Ser. No. 14/567,218, filed 11 Dec. 2014, which is incorporated by reference. One or more functionalities of the notification service according to particular embodiments may further be applied to notifications sent by one or more applications that have not been authorized by a particular user. Such notifications may request or invite the user to install or use their corresponding applications. The social-networking system 160 may similarly calculate click-through probabilities for such notifications and determine whether to display the notifications to the user based on the calculated click-through probabilities.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for automatically targeting recipients for a notification sent by an application associated with the social-networking system 160 including the particular steps of the method of FIG. 4, this disclosure contemplates any suitable method for automatically targeting recipients for a notification sent by an application associated with the social-networking system 160 including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In particular embodiments, the social-networking system 160 may detect one or more actions taken by the candidate recipient upon display of one or more of the accessed notifications and modifying the machine-learning model based on the detected actions. After delivering a notification, the social-networking system 160 may detect and log the recipient's activities in response to the notification. Such detecting and logging may be subject to one or more privacy settings associated with the recipient. The activities logged may comprise mouseover the notification, clicking on the notification, closing the notifications panel after a certain amount of time, closing the notifications panel immediately, another detectable activity, or any combination thereof. The social-networking system 160 may store information about the logged activities as one or more event logs associated with the application sending the notification or as social-networking information associated with the recipient. Such stored information may be added to the training data set for the machine-learning model. The machine-learning model may periodically be refined or developed using the updated training data set. The stored information may additionally or alternatively be added to one or more feature data sets associated the recipient or one or more future notifications. The stored information may thereby affect the extraction of features and calculation of click-through probabilities in future operation of the notification service.

In particular embodiments, the social-networking system 160 may apply one or more speed optimization techniques to improve the efficiency of the notification service. For one or more features that can be extracted from historical data associated with a user or an application, the social-networking system 160 may extract the features before render time and cache the features on one or more data stores 164 associated with the social-networking system 160 or other suitable storage devices. Such features may comprise, for example, a user's frequency of interacting with applications associated with the social-networking system 160 within the past week, an application's MAU, a language supported by an application, another suitable feature, or any combination thereof. The social-networking system 160 may directly retrieve one or more of the cached features at render time in creating a feature vector. Additionally, for one or more features extracted based on real-time data (e.g., the most recent time a user used an application, a user's click-through rate within the past five minutes), the social-networking system 160 may reduce the time for data-fetching operations by aggregating these data and fetching them all at once.

Figure 5:
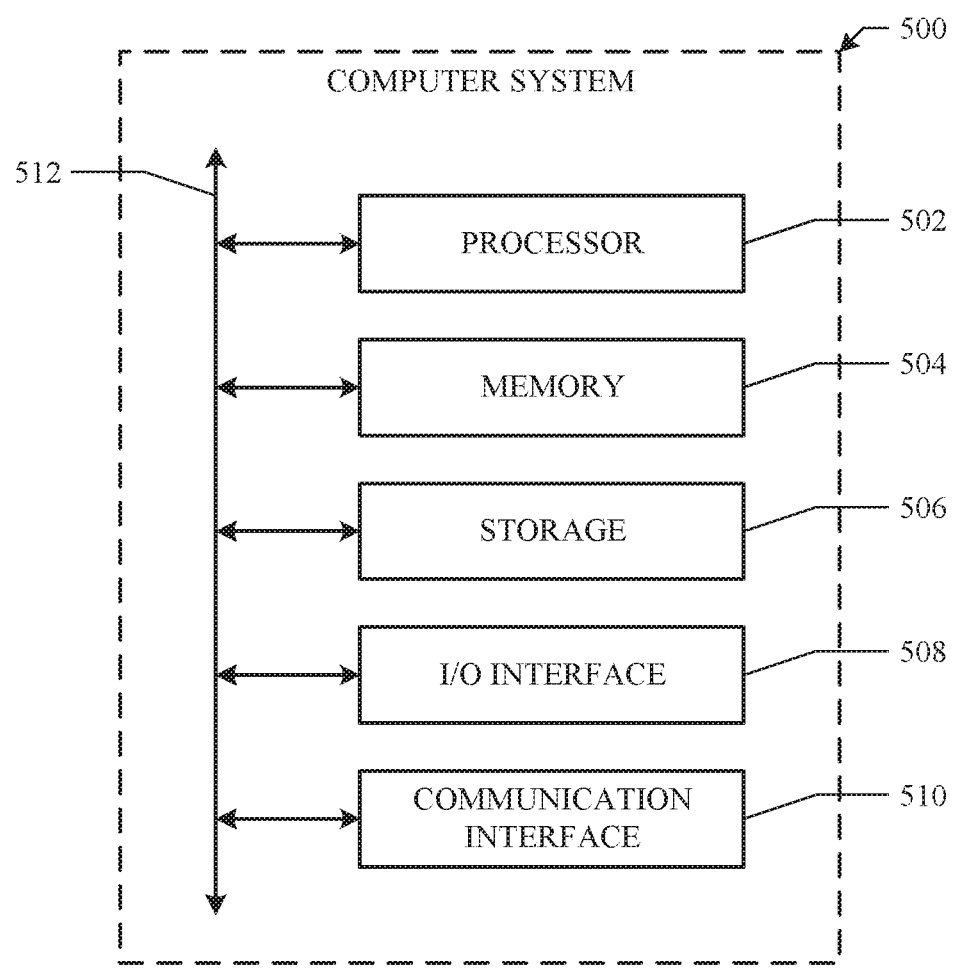
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices associated with a social-networking system:
   detecting a triggering action by a user of the social-networking system, wherein the detecting comprises receiving information about the triggering action from a client device associated with the user, wherein the triggering action comprises:
      a click-through of an icon by the user,
      a mouseover of an icon by the user, or
      a request to log in to the social-networking system by the user;
   accessing, in response to detection of the triggering action, a queue comprising a plurality of notifications, wherein each of the notifications was received by the social-networking system from an application associated with the social-networking system prior to the detecting the triggering action, and wherein the detected triggering action is associated with one or more of the notifications in the queue;
   for each of the one or more notifications in the queue associated with the triggering action:

calculating, using a machine-learning model, a click-through probability that the user will interact with the notification upon display of the notification, wherein the machine-learning model is based at least in part on one or more features associated with the user or the notification, and wherein the features comprise a period between receipt of the notification and the detecting of the triggering action;

determining whether the click-through probability satisfies a threshold; and if the click-through probability satisfies the threshold, then sending the notification to the client device associated with the user for display;

else, removing the notification from the queue.

2. The method of claim 1, wherein the features further comprise, for an application associated with the notification:
the user's frequency of interacting with notifications associated with the social-networking system within a specified timeframe;
the user's frequency of interacting with the application within a specified timeframe;
the user's click-through rate for notifications associated with the social-networking system;
the user's click-through rate for notifications associated with the application;
a time of the user's most recent interaction with the application; or
a category corresponding to the application.

3. The method of claim 1, wherein the features comprise:
the user's frequency of interacting with applications associated with the social-networking system, wherein the frequency is assessed within a specified timeframe;
the user's frequency of interacting with applications associated with the social-networking system, wherein the applications fall within a particular category;
a time of the user's most recent interaction with any application associated with the social-networking system; or
a time of the user's most recent interaction with an application associated with the social-networking system, wherein the application falls within a particular category.

4. The method of claim 1, wherein the features comprise, for an application associated with the notification:
a number of daily active users of the application;
a number of monthly active users of the application;
a growth rate of the application's number of daily active users;
a growth rate of the application's number of monthly active users;
a conversion rate associated with the application among users of the social-networking system fitting a particular demographic description; or
a language supported by the application.

5. The method of claim 1, further comprising:
computing one or more similarity scores between an application associated with at least one of the accessed notifications and one or more other applications;
identifying one or more similar applications based on the computed similarity scores; and
extracting one or more features based on the user's interactions with the identified similar applications.

6. The method of claim 1, wherein the determining whether the click-through probability satisfies a threshold further comprises, for at least one of the accessed notifications:

determining whether the triggering action took place within a timeframe within which the notification is valid.

7. The method of claim 1, further comprising:
detecting one or more actions taken by the user upon display of one or more of the accessed notifications; and
modifying the machine-learning model based on the detected actions.

8. One or more computer-readable non-transitory storage media embodying software that is operable when executed to:
detect a triggering action by a user of the social-networking system, wherein the detecting comprises receiving information about the triggering action from a client device associated with the user, wherein the triggering action comprises:
a click-through of an icon by the user,
a mouseover of an icon by the user, or
a request to log in to the social-networking system by the user;
access, in response to detection of the triggering action, a queue comprising a plurality of notifications, wherein each of the notifications was received by the social-networking system from an application associated with the social-networking system prior to the detecting the triggering action, and wherein the detected triggering action is associated with one or more of the notifications in the queue;
for each of the one or more notifications in the queue associated with the triggering action:
calculate, using a machine-learning model, a click-through probability that the user will interact with the notification upon display of the notification, wherein the machine-learning model is based at least in part on one or more features associated with the user or the notification, and wherein the features comprise a period between receipt of the notification and the detecting of the triggering action;
determine whether the click-through probability satisfies a threshold; and
if the click-through probability satisfies the threshold, then send the notification to the client device associated with the user for display;
else, remove the notification from the queue.

9. The media of claim 8, wherein the features comprise, for an application associated with the notification:
the user's frequency of interacting with notifications associated with the social-networking system within a specified timeframe;
the user's frequency of interacting with the application within a specified timeframe;
the user's click-through rate for notifications associated with the social-networking system;
the user's click-through rate for notifications associated with the application;
a time of the user's most recent interaction with the application; or
a category corresponding to the application.

10. The media of claim 8, wherein the features comprise:
the user's frequency of interacting with applications associated with the social-networking system, wherein the frequency is assessed within a specified timeframe;
the user's frequency of interacting with applications associated with the social-networking system, wherein the applications fall within a particular category;

a time of the user's most recent interaction with any application associated with the social-networking system; or a time of the user's most recent interaction with an application associated with the social-networking system, wherein the application falls within a particular category.

11. The media of claim 8, wherein the features comprise, for an application associated with the notification:
   a number of daily active users of the application;
   a number of monthly active users of the application;
   a growth rate of the application's number of daily active users;
   a growth rate of the application's number of monthly active users;
   a conversion rate associated with the application among users of the social-networking system fitting a particular demographic description; or
   a language supported by the application.

12. The media of claim 8, wherein the software is further operable when executed to:
   compute one or more similarity scores between an application associated with at least one of the accessed notifications and one or more other applications;
   identify one or more similar applications based on the computed similarity scores; and
   extract one or more features based on the user's interactions with the identified similar applications.

13. The media of claim 8, wherein the determining whether the click-through probability satisfies a threshold further comprises, for at least one of the accessed notifications:
   determining whether the triggering action took place within a timeframe within which the notification is valid.

14. The media of claim 8, wherein the software is further operable when executed to:
   detect one or more actions taken by the user upon display of one or more of the accessed notifications; and
   modify the machine-learning model based on the detected actions.

15. A system comprising: one or more processors; and a memory coupled to the processors comprising instructions executable by the processors, the processors being operable when executing the instructions to:
   detect a triggering action by a user of the social-networking system, wherein the detecting comprises receiving information about the triggering action from a client device associated with the user, wherein the triggering action comprises:
      a click-through of an icon by the user,
      a mouseover of an icon by the user, or
      a request to log in to the social-networking system by the user;
   access, in response to detection of the triggering action, a queue comprising a plurality of notifications, wherein each of the notifications was received by the social-networking system from an application associated with the social-networking system prior to the detecting the triggering action, and wherein the detected triggering action is associated with one or more of the notifications in the queue;
   for each of the one or more notifications in the queue associated with the triggering action:
      calculate, using a machine-learning model, a click-through probability that the user will interact with the notification upon display of the notification, wherein the machine-learning model is based at least in part on one or more features associated with the user or the notification, and wherein the features comprise a period between receipt of the notification and the detecting of the triggering action;
      determine whether the click-through probability satisfies a threshold; and
      if the click-through probability satisfies the threshold, then send the notification to the client device associated with the user for display;
      else, remove the notification from the queue.

16. The system of claim 15, wherein the features comprise, for an application associated with the notification:
   the user's frequency of interacting with notifications associated with the social-networking system within a specified timeframe;
   the user's frequency of interacting with the application within a specified timeframe;
   the user's click-through rate for notifications associated with the social-networking system;
   the user's click-through rate for notifications associated with the application;
   a time of the user's most recent interaction with the application; or
   a category corresponding to the application.

17. The system of claim 15, wherein the features comprise:
   the user's frequency of interacting with applications associated with the social-networking system, wherein the frequency is assessed within a specified timeframe;
   the user's frequency of interacting with applications associated with the social-networking system, wherein the applications fall within a particular category;
   a time of the user's most recent interaction with any application associated with the social-networking system; or
   a time of the user's most recent interaction with an application associated with the social-networking system, wherein the application falls within a particular category.

* * * * *